(12) United States Patent
Hashimoto et al.

(10) Patent No.: US 7,690,872 B2
(45) Date of Patent: Apr. 6, 2010

(54) CHATTERING VIBRATION INHIBITING MECHANISM OF MACHINE TOOL

(75) Inventors: Kazutada Hashimoto, Yamatokoriyama (JP); Osamu Fukunaga, Yamatokoriyama (JP); Takashi Hoshi, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 414 days.

(21) Appl. No.: 11/723,746

(22) Filed: Mar. 21, 2007

(65) Prior Publication Data

US 2007/0243033 A1 Oct. 18, 2007

(30) Foreign Application Priority Data

Apr. 4, 2006 (JP) ............................. 2006-102739

(51) Int. Cl.
*B23Q 11/00* (2006.01)
(52) U.S. Cl. ....................................... 409/141; 188/378
(58) Field of Classification Search ................. 409/141, 409/235, 231; 408/234; 188/378–380; 267/137, 267/140.5
See application file for complete search history.

(56) References Cited

U.S. PATENT DOCUMENTS

| 2,960,189 | A | * | 11/1960 | Osburn | 188/381 |
| 2,998,867 | A | * | 9/1961 | Dall | 188/380 |
| 3,230,831 | A | * | 1/1966 | Harker | 409/141 |
| 3,486,585 | A | * | 12/1969 | Richter et al. | 188/379 |
| 3,522,864 | A | * | 8/1970 | Richter | 188/380 |
| 3,690,414 | A | * | 9/1972 | Aggarwal et al. | 188/378 |
| 5,871,315 | A | * | 2/1999 | Burt et al. | 409/225 |
| 6,296,093 | B1 | * | 10/2001 | Norris et al. | 188/378 |
| 6,719,503 | B1 | * | 4/2004 | McCalmont et al. | 409/141 |
| 2002/0170793 | A1 | * | 11/2002 | Kemeny | 188/378 |

FOREIGN PATENT DOCUMENTS

| JP | 56-102441 A | 8/1981 |
| JP | 06320383 A | 11/1994 |

* cited by examiner

*Primary Examiner*—Daniel W Howell
(74) *Attorney, Agent, or Firm*—Smith Patent Office

(57) ABSTRACT

A chattering vibration inhibiting mechanism capable of inhibiting chattering vibration of a machine tool without increasing weight nor requiring a time-consuming adjustment work is provided. A box-shaped package body 21 attached to a spindle head 6, a supporting member 22 disposed to bridge between front and rear walls 21a, 21b in the box-shaped package body 21, and a damper 23 composed of an elastic member 27 and a weight 26 supported by the supporting member 22 are provided.

4 Claims, 5 Drawing Sheets

US 7,690,872 B2

CHATTERING VIBRATION INHIBITING MECHANISM OF MACHINE TOOL

BACKGROUND OF THE INVENTION

1. Field of the Invention

The present invention relates to a machine tool provided with a spindle equipped with a tool and a spindle head supporting the spindle in a rotatable manner, and more specifically to, a chattering vibration inhibiting mechanism designed to inhibit chattering vibration generated in machining of a work.

2. Description of the Related Art

In a machine tool, accuracy in machining of a work possibly degrades due to chattering vibration generated in the machining of the work. In order to inhibit the chattering vibration as described above, for instance, according to Japanese Patent Application Laid-Open No. Sho56-102441, there is one, in which a container accommodating many solid fine particles made of metal particles having a spherical shape or a tip shape is disposed at an irrotational portion in the vicinity of a cutting tool.

Meanwhile, a structure disposing a container accommodating many solid fine particles as in the above-described conventional device causes problems that the weight increases due to the solid fine particles and that the adjustment by increasing/decreasing the solid fine particles is a time-consuming work.

SUMMARY OF THE INVENTION

It is an object of the present invention to provide a chattering vibration inhibiting mechanism of a machine tool capable of inhibiting chattering vibration without increasing weight nor requiring a time-consuming adjustment work.

The present invention is a chattering vibration inhibiting mechanism of a machine tool designed to inhibit chattering vibration caused in machining by the machine tool provided with a spindle head supporting a spindle equipped with a tool in a rotatable manner, comprising: a box-shaped package body attached to the spindle head; a supporting member disposed in the box-shaped package body; and a damper composed of an elastic member and a weight which are supported by the supporting member.

In the present invention, the box-shaped package body attached to the spindle head, the supporting member disposed in the box-shaped package body, and the weight supported by the supporting member via the elastic member are provided, in which although the chattering vibration generated in the machining of the work is transmitted from the supporting member to the weight via the elastic member, the weight is hard to vibrate due to its larger inertia, so that the chattering vibration is absorbed as a result thereof. Based on the above, the machining of the work can be improved in precision without increasing weight nor requiring the time-consuming adjustment work.

According to a preferable embodiment of the present invention, the supporting member is disposed to bridge mutually facing walls of the box-shaped package body to make an axis line thereof be in parallel with a spindle axis of the spindle head.

In this embodiment, the supporting member is disposed such that the axis line thereof becomes in parallel with the spindle axis of the spindle head, in which the supporting member is disposed almost in the transmitted direction of the chattering vibration of the tool, allowing transmitting the chattering vibration to the weight via the elastic member with high efficiency.

According to another preferable embodiment of the present invention, the damper is composed of the elastic members disposed and fixed onto both surfaces of the weight, and in which the damper is fixed to the supporting member with a space provided between the weight and the supporting member.

In this embodiment, the elastic members are disposed and fixed onto both the surfaces sandwiching the weight by providing the space between the weight and the supporting member, allowing the weight to be freed from the supporting member, so that the chattering vibration can be absorbed with high efficiency.

According to still another preferable embodiment of the present invention, an attached position of the damper with respect to the supporting member is adjustable in the axial direction of the supporting member.

In this embodiment, the attached positions of the elastic member and the weight with respect to the supporting member are made adjustable, allowing the weight to be placed at a position with high chattering-vibration absorbency, so that the efficiency in absorbing the chattering vibration can be improved further.

According to yet another preferable embodiment of the present invention, the box-shaped package body is disposed on an end surface of the spindle head opposite to an end surface equipped with the tool.

In this embodiment, the box-shaped package body is disposed on such an end surface of the spindle head that is opposite to the end surface equipped with the tool, namely the chattering vibration inhibiting mechanism can be disposed by effectively using an open area on the rear side of the spindle head, so that a region to be machined is not limited by the chattering vibration inhibiting mechanism.

DETAILED DESCRIPTION OF THE PREFERRED EMBODIMENT

Hereinafter, an embodiment of the present invention will be described with reference to the attached drawings.

Figure 1:
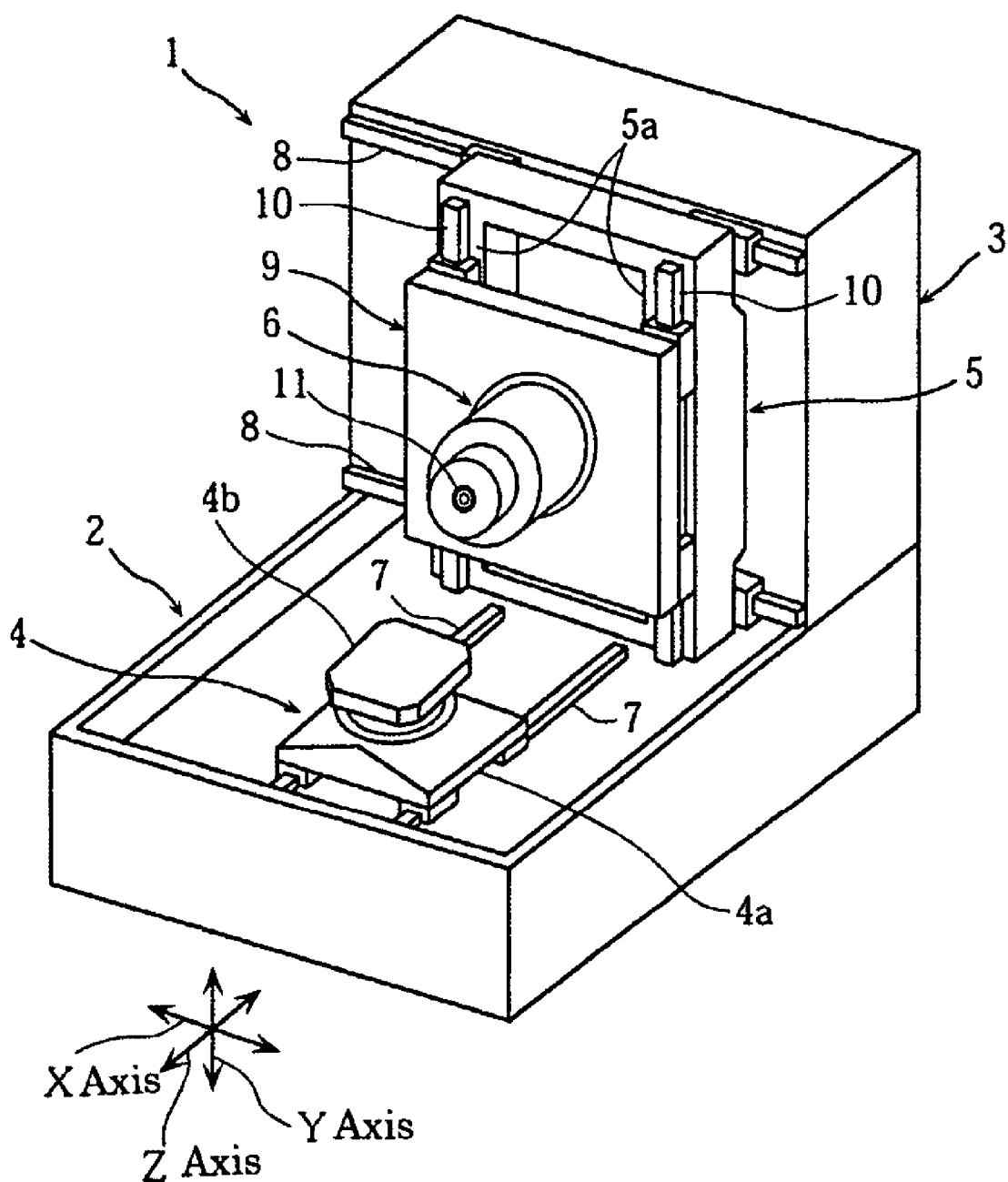
FIG. 1 a perspective view of a machine tool according to an embodiment of the present invention.
Figure 2:
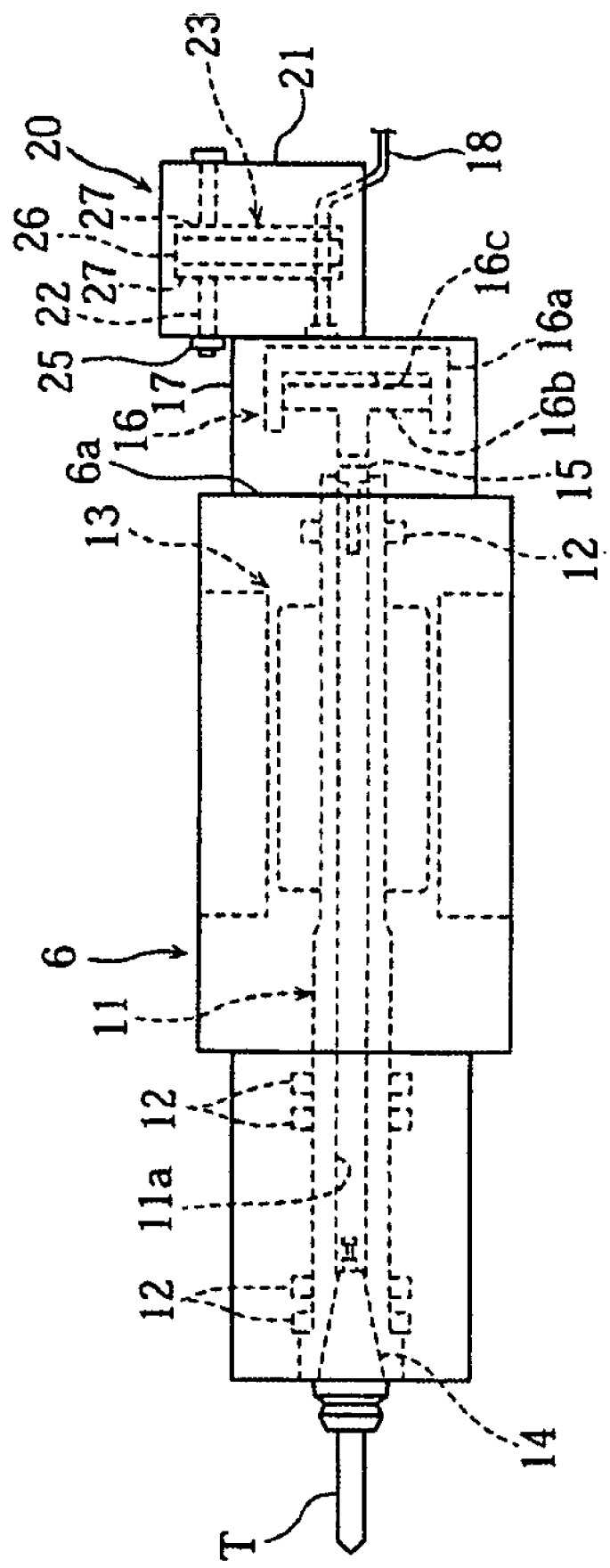
FIG. 2 is a side view of a spindle head of the machine tool.
Figure 3:
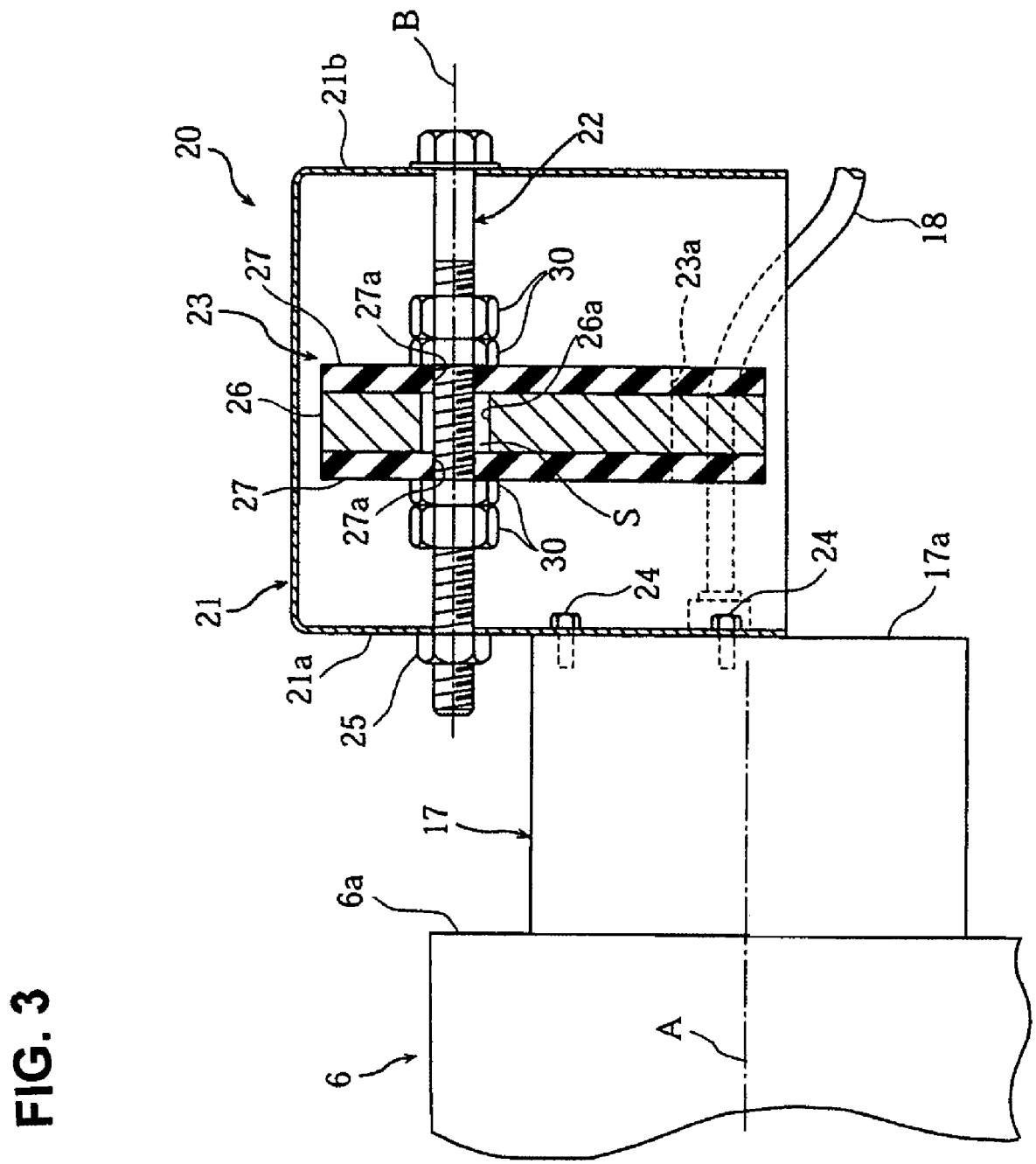
FIG. 3 is a sectional view of a chattering vibration inhibiting mechanism disposed on the spindle head.
Figure 4:
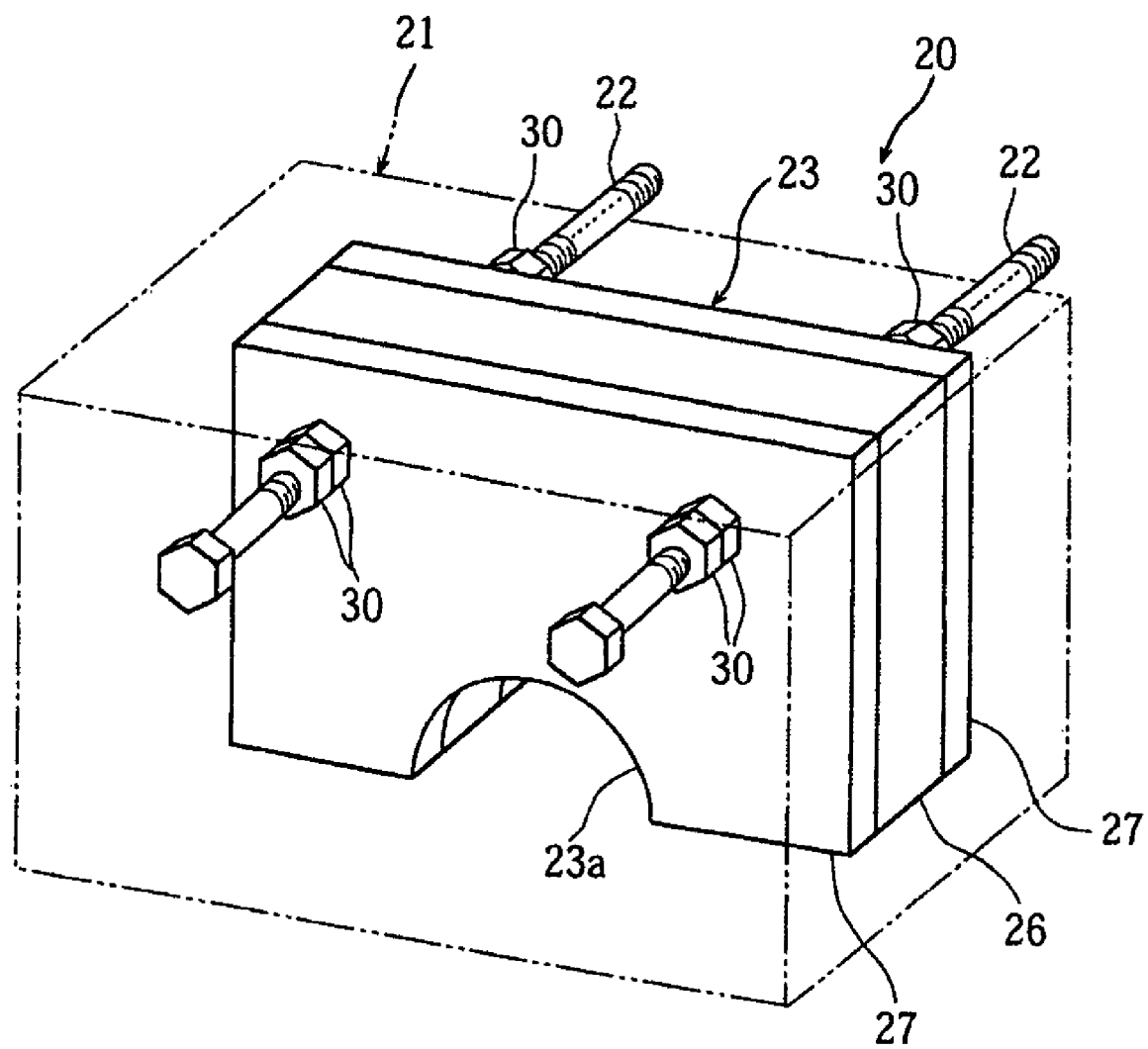
FIG. 4 is a perspective view of the chattering vibration inhibiting mechanism.

FIG. 1 to FIG. 4 are views to illustrate a chattering vibration inhibiting mechanism of a machine tool according to the embodiment of the present invention, in which FIG. 1 is a perspective view of the machine tool, FIG. 2 is a side view of a spindle head, FIG. 3 and FIG. 4 are a sectional view and a perspective view, respectively, of the chattering vibration inhibiting mechanism.

In the drawings, "1" denotes a lateral machining center. A bed 2 of the machining center 1 is rectangular in plan view with an arch-shaped column 3 being disposed and fixed in a standing manner at the rear end portion thereof. A working table 4 is disposed in front of the column 3 in a movable manner in the z-axis (front and rear) direction. A saddle 5 is disposed on the front surface of the column 3 in a movable manner in the x-axis (right and left) direction with a spindle head 6 thereon in a movable manner in the y-axis (vertical) direction.

The working table 4 includes a supporting base 4a and a work-mounting table 4b disposed on the supporting base 4a. The supporting base 4a is supported in a movable manner in the z-axis direction by a pair of right and left guide rails 7, 7 disposed on the bed 2.

The saddle 5 is formed into a rectangular-frame shape and is supported in a movable manner in the x-axis direction by a pair of upper and lower guide rails 8, 8 disposed on the upper end portion and the lower end portion of the column 3, respectively.

The spindle head 6 is fixed to a rectangular spindle base 9 with the axial center thereof being oriented in the z-axis direction. The spindle base 9 is supported in a movable manner in the y-axis direction by a pair of right and left guide rails 10, 10 disposed on right and left vertical sides 5a, 5a, respectively, of the saddle 5. The spindle head 6 is supported almost in a manner that the front-side half thereof is positioned frontward of the spindle base 9 and the rear-side half is positioned rearward of the spindle base 9, the rear-side half is thereby positioned in the openings of the saddle 5 and the column 3.

The spindle head 6 has a cylindrical shape and a spindle 11 is disposed by being inserted into the spindle head 6. The spindle 11 is supported in a rotatable manner by the spindle head 6 via a plurality of bearings 12. Further, a spindle motor 13 is incorporated into the spindle head 6, and the spindle 11 is driven to rotate by the spindle motor 13.

A tool holder 14 holding a rotating tool T is attached to the frond end portion of the spindle 11 in an attachable/detachable manner. A spindle hole 11a is formed at the axial center of the spindle 11 and a clamping mechanism composed of a draw bar 15 clamping the tool holder 14 and a disk spring (not shown) is disposed in the spindle hole 11a.

An unclamping mechanism 16 is disposed at a rear end surface 6a of the spindle head 6. The unclamping mechanism 16 is covered by a metal cover 17 fasten and fixed to the rear end surface 6a of the spindle head 6, and is composed of a cylindrical portion 16a, a piston portion 16b inserted in a movable manner into the cylindrical portion 16a and a hydraulic chamber 16c formed by the cylindrical portion 16a and the piston portion 16b. A hydraulic supply pipe 18 is connected to the hydraulic chamber 16c. The hydraulic supply pipe 18 is disposed at the rear side by passing through the cover 17 to be connected to a hydraulic source (not shown). Note that the unclamping mechanism 16 together with the cover 17 in the present embodiment composes a part of the spindle head 6.

Hydraulic pressure is supplied to the hydraulic chamber 16c via the hydraulic supply pipe 18 and the piston portion 16b makes a forward move to thereby move the draw bar 15 in an unclamping direction, so that the tool holder 14 is released to be unclamped. When the hydraulic pressure is released, the piston portion 16b makes a rearward move to thereby move the draw bar 15 in the clamping direction by the disk spring, so that the tool holder 14 is clamped.

The lateral machining center 1 is provided with a chattering vibration inhibiting mechanism 20 inhibiting chattering vibration generated in the machining of the work by the rotating tool T. The chattering vibration inhibiting mechanism 20 includes a box-shaped package body 21 made of metal and attached onto the cover 17 composing the part of the spindle head 6, a pair of right and left supporting members 22, 22 formed by a bolt, respectively, and bridged between mutually facing front and rear walls 21a, 21b in the box-shaped package body 21, and a damper 23 hung from and supported by the respective supporting members 22, 22.

The box-shaped package body 21 has almost a cuboid shape with its bottom face opening downward, and the front wall 21a thereof is fastened and fixed by a plurality of bolts 24 to a rear wall portion 17a of the cover 17 disposed on such a side of the spindle head 6 that is opposite to the rotating tool T side. The box-shaped package body 21 is disposed such that the upper portion thereof protrudes upward compared with the upper surface of the cover 17.

The right and left supporting member 22, 22 are inserted so as to penetrate through the front and rear walls 21a, 21b of the above-described protruding portion protruding upward from the cover 17 and are fixed to the box-shaped package body 21 by nuts 25, 25. With this, the respective supporting members 22, 22 are disposed so that their axis lines B, B are positioned in parallel with a spindle axis A of the spindle 6 and in a mutually symmetrical manner with respect to the spindle axis A at the positions higher than the spindle axis A.

The damper 23 has a rectangular block shape and includes a weight 26 and a pair of elastic members 27, 27 made of a rubber plate, respectively, and adhered to both the main surfaces of the weight 26. At the lower portion of the damper 23, a relief recession 23a is formed to prevent the damper 23 from interfering with the hydraulic supply pipe 18, and thereby the hydraulic supply pipe 18 goes through the relief recession 23a to extend rearward from the lower-end opening of the box-shaped package body 21.

At the right and left upper portions of the weight 26 and the respective elastic members 27, 27, through holes 27a, 26a are formed to have the same axis, and the supporting member 22 is inserted through the right and left through hole 27a and the through hole 26a, respectively. With this, the attached position of the damper 23 is made adjustable in the axial direction of the supporting members 22, 22.

The through hole 27a of the elastic member 27 has a size capable of abutting on the outer peripheral surface of the supporting members 22. Meanwhile, the through hole 26a of the weight 26 is formed to have a larger diameter compared with that of the supporting member 22, and thereby a predetermined space s is provided between the supporting member 22 and the through hole 26a.

A pair of double nuts 30, 30 is screwed at each of the supporting members 22, 22, and thereby the damper 23 is fixed at the axial center of the supporting members 22, 22 by screwing up the elastic members 27, 27 with the respective double nuts 30, 30.

A predetermined machining is carried out with respect to a work by the rotating tool T while the working table 4 with the work fixed thereon is moved in the z-axis direction, the saddle 5 is moved in the x-axis direction and the spindle head 6 is moved in the y-axis direction, respectively, in a relative manner. In this case, during the machining of the work carried out by the rotating tool T, the chattering vibration was possibly generated at the rotating tool T.

On this matter, according to the chattering vibration inhibiting mechanism 20 of the present embodiment, there are provided the box-shaped package body 21 fastened and fixed to the spindle head 6 by the bolts, the pair of supporting members 22, 22 fastened and fixed by being bridged between the mutually facing front and real walls 21a, 21b in the box-shaped package body 21, and the damper 23 composed of the elastic member 27 and the weight 26 supported by the supporting member 22, in which, although the chattering vibration generated at the rotating tool T is transmitted from the supporting member 22 to the weight 26 via the elastic member 27, the chattering vibration is absorbed by the weight 26 in that the weight 26 is difficult to move because of its large inertia. Based on the above, the machining of the work can be improved in precision without increasing weight nor requiring a time-consuming adjustment work.

In the present embodiment, the chattering vibration inhibiting mechanism 20 is disposed on the rear wall portion 17a of the cover 17 at such a side of the spindle head 6 that is opposite to the side having the rotating tool T, allowing the effective use of the open space at the rear side of the spindle head 6, so that the region to be machined by the rotating tool T is not limited.

In the present embodiment, the supporting member 22 is disposed such that the axis line thereof is in parallel with the spindle axis of the spindle head, in which the supporting member 22 is disposed almost in the transmitted direction of the chattering vibration of the tool, allowing transmitting the chattering vibration to the weight 26 via the elastic member 27 with high efficiency.

In the present embodiment, the damper 23 is formed by the elastic members 27, 27 adhered to both the surfaces of the weight 26, and the damper 23 is fixed to the supporting member 22 with the space s being provided between the supporting member 22 and the weight 26, allowing the chattering vibration to be absorbed with high efficiency.

Further, the attached position of the damper 23 with respect to the supporting member 22 is made adjustable, in which the attached position is adjustable to that with higher chattering-vibration absorbency, so that the chattering vibration inhibiting effect can be improved further.

Figure 5:
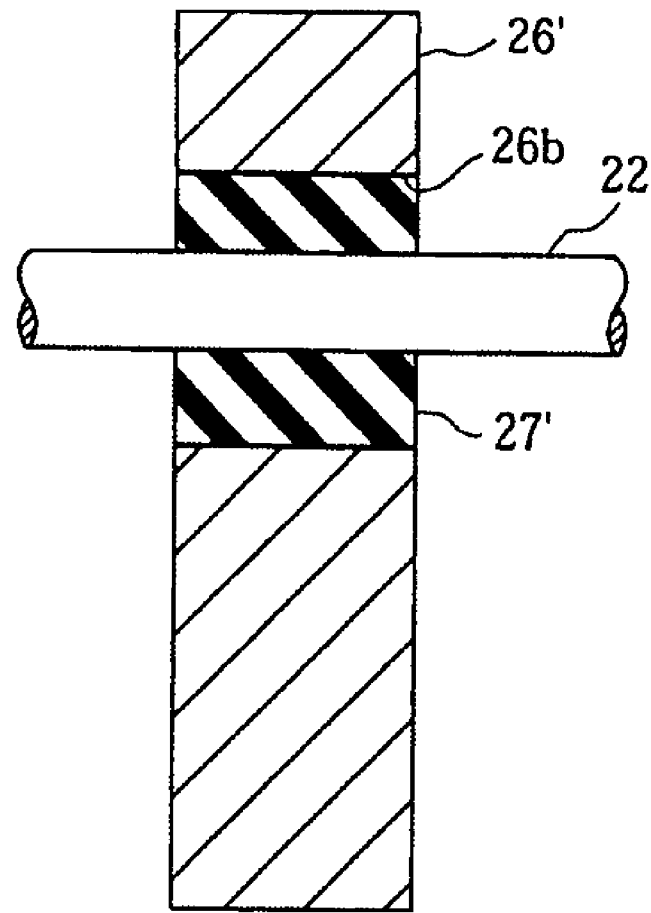
FIG. 5 is a sectional view of a chattering vibration inhibiting mechanism according to a modification example of the above-described embodiment.

Note that, in the above-described embodiment, the description has been given to the case where the elastic members 27, 27 are adhered to both the surfaces of the weight 26 and the elastic members 27, 27 are fixed to the supporting members 22, 22 with the space s provided between the supporting members 22, 22 and the weight 26, however, in the present invention, as shown for example in FIG. 5, it is also acceptable that the hole 26b is formed in a weight 26', an elastic member 27' is inserted into and fixed to the hole 26b, the supporting member 22 is inserted into the axial center of the elastic member 27', and thereby the weight 26' is supported by the supporting member 22 via the elastic member 27'. Also, in this case, substantially the same effect as of the above-described embodiment can be obtained.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A chattering vibration inhibiting mechanism of a machine tool designed to inhibit chattering vibration caused in machining by the machine tool provided with a spindle head supporting a spindle equipped with a tool in a rotatable manner, comprising:
   a box-shaped package body attached to said spindle head;
   a supporting member disposed in said box-shaped package body; and
   a damper composed of an elastic member and a weight which are supported by said supporting member;
   wherein said supporting member is disposed to bridge mutually facing walls of said box-shaped package body to make an axis line thereof be in parallel with a spindle axis of said spindle head, and
   wherein said damper is composed of a weight in a plate shape and a pair of elastic members in a plate shape fixed to both surfaces of the weight, attached to said supporting member, and fixed to said supporting member by a pair of double nuts screwed with said supporting member, and an attaching position of said damper in the axial direction of said supporting member is adjusted by fastening or loosening the double nuts.

2. The chattering vibration inhibiting mechanism of the machine tool according to claim 1,
   wherein said box-shaped package body is disposed on an end surface of said spindle head opposite to an end surface equipped with the tool.

3. A chattering vibration inhibiting mechanism of a machine tool caused when machining with the machine tool, the machine tool being provided with a spindle head supporting a spindle equipped with a tool in a rotatable manner, comprising:
   a box-shaped package body attached to the spindle head;
   a supporting member disposed in said box-shaped package body; and
   a damper comprising a substantially rectangularly shaped weight and a pair of elastic members disposed on both main surfaces of said weight, said damper being supported by said supporting member;
   wherein said supporting member is disposed through mutually facing walls of said box-shaped package body so that a longitudinal axis of said supporting member is parallel with a rotational axis of the spindle head;
   wherein said damper is attached to said supporting member by a pair of double nuts screwed on said supporting member; and
   wherein a position of said damper on said supporting member is adjustable by loosening and tightening said pair of double nuts.

4. The chattering vibration inhibiting mechanism as defined in claim 3, further comprising a further elastic member disposed between said weight and said supporting member.

* * * * *